Patented Aug. 18, 1936

2,051,220

UNITED STATES PATENT OFFICE 2,051,220

TREATMENT OF CELLULOSE TO RENDER IT SUITABLE FOR ESTERIFICATION

Carl J. Malm, Rochester, N. Y., and Charles L. Fletcher, Kingsport, Tenn., assignors to Eastman Kodak Company, Rochester, N. Y., a corporation of New York No Drawing. Application September 29, 1933, Serial No. 691,570

3 Claims. (Cl. 260—101)

The present invention relates to the treatment of cellulose to incorporate therein a high boiling material which is miscible with water but does not form a constant boiling mixture therewith and which does not have a degrading effect upon the cellulose preferably by adding it to the last wash bath before the drying of the cellulose.

Heretofore in the manufacture of an organic acid ester of cellulose such as cellulose acetate, cotton containing 2–5% of moisture has been employed as the starting material. For instance in U. S. Patent No. 1,278,885 to Henry Dreyfus cellulose is esterified in an acetylation bath comprising acetic acid, acetic anhydride and sulfuric acid as the catalyst. It is disclosed therein that it is preferable not to employ dry cellulose as the starting material but rather cellulose having a moisture content of 3–6% as the reaction goes on more readily and rapidly. In U. S. Patent No. 1,236,579 of Wm. G. Lindsay an acetylation process is described in which zinc chloride is employed as the catalyst, in which for best results the cellulose which is employed as the starting material should contain a normal amount of moisture, generally from 2% to 4% and preferably 3½%. In U. S. Patent Reissue No. 14,338 of Henry Dreyfus the cellulose preferred as the starting material in the esterification process described therein contains about 5% moisture. The patent literature relating to cellulose acetylation processes points out repeatedly the necessity of leaving at least 2% of moisture in the cellulose in order to get a smooth and even esterification. In order to obtain a material containing not less than 2% of moisture it is necessary to dry the cellulose at a low temperature, which requires much more time than where a higher temperature may be employed. This of course makes necessary the use of drying equipment for a longer time for a given batch of cellulose than would be required where a higher temperature was employed.

One object of our invention is to provide a process of drying cellulose to prepare it for esterification in which the moisture content of the cellulose may be reduced below 2% or even 1% of moisture without affecting its reactivity or uniformity in any way. Another object of our invention is to provide a process of drying cellulose to prepare it for esterification which may proceed more rapidly than formerly thus making possible the preparation of a greater amount of cellulose than formerly in a given amount of equipment. Another object of our invention is to provide a cellulose suitable for esterification in which a minimum of the more expensive acetic anhydride is converted into acetic acid due to the moisture content of the cellulose. Other objects will appear herein.

We have found that if a high boiling material, which is miscible with water but does not form a constant boiling mixture therewith and which does not have a degrading effect upon cellulose is added to the washing bath before the drying of the cellulose in preparation for its esterification so as to leave from 1 to 5% of this material on the dry cellulose, the cellulose may be dried down to a moisture content of less than 1% without affecting its reactivity or the uniformity of the esterification in any way. We have found that due to the facts that in accordance with the present invention the moisture content of the cellulose may be reduced below that formerly considered necessary and that degradation of the cellulose is avoided, the drying of the cellulose may be carried on at higher temperatures and as a consequence in a shorter time than was formerly the case in the drying of cellulose to prepare it for esterification.

Our invention is carried out by incorporating a small amount of a polyhdroxy alcohol in cellulose and then drying the same. This incorporation is preferably carried out by dissolving the polyhydroxy alcohol in the water employed as the last wash for the cellulose prior to its drying. As a general rule the amount of polyhydroxy alcohol which is used is such as to leave 1 to 5% of it on the dry cellulose fibers. The amount of polyhydroxy alcohol which is left on the cellulose is proportional to the amount of the wash water which is retained by the fibers. As a general rule, pressing or centrifuging is resorted to, to reduce the amount of moisture which must be removed by drying. The method of removing the water and the tendency of the fibers to hold the water each determines the amount of liquid which the cellulose will retain which in turn determines the percentage of polyhydroxy alcohol which must be incorporated in the wash water in each individual instance.

The following examples illustrate processes which embody our invention:

Example I

A bath of cotton linters purified in the usual way and washed free from the chemicals employed in the purification treatment, was washed with distilled water containing ½% of glycerol. The cellulose was then centrifuged after which it had a water content of two parts for every one of cellulose. The whole was then subjected to a temperature of 220° F. until it had a moisture content of ½ of 1%. Some of this material was acetylated in the customary manner (acetic anhydride and sulfuric acid) and the resulting mixture was a dope of very exceptional clarity. Some of the same cotton linters as were employed in the above batch were given a last washing with distilled water in which there was no glycerol present and were dried in the same manner as before. Upon treating this cellulose in an acetylation bath it was found that the esterification required a very much longer time than before and that the mixture resulting was found to be very hazy and grainy and full of fibers.

*Example II*

A batch of cotton linters which had been purified in the usual way and washed free of the purifying materials was washed with distilled water containing ½% of propylene glycol and the mass was pressed down until the resulting pressed cellulose had a content of 2 parts of water to 1 part of cellulose. The cellulose was subjected to a temperature of about 220° F. until it contained less than ½% of moisture therein. This material was then acetylated with the same favorable results as were found in the acetylation of the previous example.

Various other high boiling liquids of the general type of the glycols will suggest themselves to those skilled in the art as being suitable for use in the present invention. Other liquids in addition to those employed in the examples such as ethylene glycol and trimethylene glycol have been found to be eminently suitable for use in a process carried out in accordance with the present invention.

The drying in the present invention may be carried out at any temperature which will drive off the moisture from the cellulose providing of course that it is not so intense that scorching occurs. Temperatures at the boiling point of water or above are preferred as the water is thereby rapidly driven off. However, temperatures below the boiling point of the water may be employed especially where a current of warm dry air is allowed to pass thru the cellulose mass.

We claim as our invention:

1. A method of drying cellulose preparatory to its esterification which comprises treating it with an aqueous solution of an aliphatic polyhydroxy alcohol of a concentration which will leave 1% to 5% of the alcohol on the cellulose after pressing and drying, pressing the cellulose to remove the excess of the solution and then subjecting the cellulose to the drying action of an elevated non-scorching temperature.

2. A method of drying cellulose preparatory to its esterification which comprises treating it with an aqueous solution of a glycol of a concentration which will leave 1% to 5% of the glycol on the cellulose after pressing and drying, pressing the cellulose to remove the excess of the solution and then subjecting the cellulose to the drying action of an elevated non-scorching temperature.

3. A method of drying cellulose preparatory to its esterification which comprises treating it with an aqueous solution of an ethylene glycol of a concentration which will leave 1% to 5% of the ethylene glycol on the cellulose after pressing and drying, pressing the cellulose to remove the excess of the solution and then subjecting the cellulose to the drying action of an elevated non-scorching temperature.

CARL J. MALM.
CHARLES L. FLETCHER.